United States Patent Office 3,005,014
Patented Oct. 17, 1961

3,005,014
SULFONATED CYCLOBUTANE COMPOUNDS
James Herbert Werntz, Wilmington, Del., assignor to E. I. du Pont de Nemours and Company, Wilmington, Del., a corporation of Delaware
No Drawing. Filed Mar. 18, 1958, Ser. No. 722,137
18 Claims. (Cl. 260—464)

This invention relates to sulfonated organic compounds. More particularly, it relates to sulfonated cyclic compounds that are capable of improving the affinity of polyester fibers for basic dyes.

Polyester fibers, e.g., fibers of polyethylene terephthalate, have various properties which make them valuable in many commercial applications. However, they do not possess as high affinities for basic dyes as is desired in some cases. One object of the present invention is to obtain a novel and useful class of cyclobutanes. A further object is to prepare modifiers for polyester fibers that are capable of improving the dye affinity of such fibers for basic dyes.

The products of this invention are cyclobutanes containing (a) a sulfo($HO_3S$—) or sulfo-lower alkyl($HO_3S$—lower alkyl—) group or a salt of either of these groups, and (b) at least one carboxyl (COOH) group or groups hydrolyzable thereto. The groups hydrolyzable to carboxyl include COOR, CONHR', COOM, and CN, wherein R is a monovalent hydrocarbon radical, R' is H or R, and M is an ammonium radical, a substituted ammonium radical or a metal atom, i.e., cyano, carbamyl, N-hydrocarbylcarbamyl, hydrocarbyloxycarbonyl, metal carboxylate, ammonium carboxylate and substituted ammonium carboxylate groups. Preferred because of the ready availability of the starting materials necessary for their preparation are those cyclobutanes bearing the (a) and (b) groups respectively on two non-adjacent nuclear carbons, any other substituents on such carbons being alkyl (preferably 1–6 carbon alkyl, i.e., lower alkyl) and at most one of the remaining nuclear carbons being substituted and that mono-substituted with a second (b) group in which case the (b) groups taken together may be the divalent

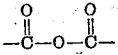

radical.
These preferred products have the following general formula:

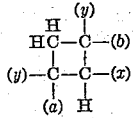

wherein
(a) is $HO_3S$—, $MO_3S$—, $HO_3S$-lower alkyl-, or $MO_3S$-lower alkyl-
(b) is —COOH, —COOR, —COOM, —CONHR' or —CN
(x) is H or (b)
(x) and (b) together is

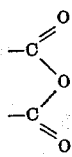

(y) is H or lower alkyl
R, R' and M are defined as above.

The sulfonated cyclobutanecarboxylic acids and derivatives hydrolyzable thereto which form the products of this invention are prepared by reacting a water-soluble bisulfite with a 3-methylenecyclobutanecarboxylic acid, a 3-alkyl-2-cyclobutene-1,2-dicarboxylic acid, or a derivative of either of these that is hydrolyzable to the respective acid. This reaction is conveniently carried out by contacting the cyclobutane or cyclobutene reactant with a water-soluble bisulfite, e.g., ammonium or sodium bisulfite, in a polar solvent, e.g., water or an alcohol, at a temperature between 0° C. and 175° C., preferably until the products are dissolved in the reaction mixture. Mixtures of the bisulfites can be used.

The proportions of reactants used are not critical; however, it is preferred that an excess (i.e., above stoichiometric amounts) of bisulfite, e.g., a 50–100% excess of bisulfite, be employed. Likewise, the concentration of the bisulfite in the solvent is not critical, concentrations of bisulfites ranging up to 65% being operable. However, it is preferred to use bisulfite concentrations ranging up to 20%.

While temperatures between 0° and 175° C. are satisfactory, higher temperatures can be used if desired but they do not give any better results. The reaction is preferably carried out at temperatures between 25° C. and the reflux temperature of the reaction mixture, as this can be carried out at atmospheric pressure. Temperatures above the boiling point of the reaction mixture are operable and can be used if desired provided a closed reaction system which is capable of withstanding the super-atmospheric pressures developed at these higher temperatures is employed.

Any polar solvent can be used in the process. Water, methanol, ethanol and mixtures of water with these alcohols, are preferred since they are most economical and give excellent results.

While it is not necessary to carry out the reaction in an inert atmosphere, it is preferred to do so to avoid peroxide formation during the reaction, particularly when azo catalysts are being used. Nitrogen or other inert gas, e.g., helium, is satisfactory for blanketing the reaction mixture.

The reaction between the bisulfite and the methylenecyclobutane- or cyclobutenecarboxylic acid takes place in the absence of a catalyst. However, it is often desirable to use a catalyst, especially when reactants having double bonds of low reactivity are employed. Suitable catalysts include organic peroxides, e.g., benzoyl peroxide, tertiary butyl hydroperoxide, inorganic peroxy compounds, e.g., ammonium persulfate, azo compounds, e.g., α,α'-azodiisobutyronitrile, and ultraviolet light. Catalysts are ordinarily used in amounts up to about 15% by weight of the cyclic compound.

When operating in water solutions, a pH range between 2 and 8.0 is used. There is substantially less oxidation of the bisulfite at pH 6 than at pH 3. Under certain conditions, the reaction becomes more acidic as it proceeds and it is frequently desirable to add a buffering agent in order to maintain the pH at a constant value. The preferred pH range is between 3 and 6.

The time required to complete the reaction between the bisulfite and the methylenecyclobutane-, or cyclobutenecarboxylic acid is dependent on such factors as the reaction temperature and the relative reactivity of the double bonds in the unsaturated reactants. Times ranging from 4 hours at reflux temperature of an aqueous reaction mixture to 5 days at room temperature are common. It is customary, but not necessary, to continue the reaction until all the products are dissolved in the reaction mixture.

The invention is illustrated in further detail in the following examples in which the proportions of ingredients are expressed in parts by weight unless otherwise noted.

EXAMPLE I

*Ammonium salt of 3-sulfomethylcyclobutanecarbonitrile*

Sixty-seven parts of a 45% aqueous solution of ammonium bisulfite (containing 30 parts of ammonium bisulfite), 233 parts of deoxygenated water, 2.7 parts of a 70% solution of diisopropylbenzene hydroperoxide, and 18.4 parts of 3-methylenecyclobutanecarbonitrile are charged into a glass reaction vessel and stirred under an atmosphere of nitrogen. At the start of the reaction the acidity of the reaction mixture is at pH 5.9. After stirring for 24 hours the pH rises to 6.5, and after 48 hours rises to pH 7.8. The pH is then adjusted by the addition of dilute sulfuric acid to 6.7, but it rises again in 30 minutes to a pH of 7.4. The reaction mixture is stirred under nitrogen for an additional 3 days. At the end of this time there is still an unreacted oil layer amounting to 2.5 parts. Three hundred parts of the aqueous layer is poured into approximately 1200 parts of absolute ethyl alcohol and the unreacted ammonium bisulfite which precipitates is filtered off. The filtrate is concentrated to about one-tenth of its volume, diluted with 2 volumes of ethyl alcohol, and evaporated at room temperature. The resulting crystalline product is dissolved in about 240 parts of hot absolute ethyl alcohol and is then filtered. The filtrate is concentrated to about one-third of its volume and 18.6 parts of cream-colored solid ammonium salt of 3-sulfomethylenecyclobutanecarbonitrile separates.

*Analysis.*—Calc'd for $C_6H_{12}N_2SO_3$: N, 14.6%; S, 16.7%. Found: N, 14.3%; S, 17.2%.

EXAMPLE II

*Sodium salt of 3-sulfomethylcyclobutanecarbonitrile*

A mixture of 18.4 parts of 3-methylenecyclobutanecarbonitrile, 31.2 parts of sodium bisulfite, 270 parts of water and 1.84 parts of t-butyl peroxide, having a pH of 4.5, is stirred under nitrogen for 24 hours. After stirring for 18 hours, all of the oil layer is dissolved. The sodium salt of 3-sulfomethylcyclobutanecarbonitrile obtained in this way is a white solid which is soluble in water.

EXAMPLE III

*3-sulfomethylcyclobutanecarboxylic acid and its disodium salt*

A reaction vessel is charged with the crude reaction mixture containing the sodium salt of 3-sulfomethylcyclobutanecarbonitrile made as described in Example II, and 40 parts of sodium hydroxide is dissolved in the mixture. The reaction mixture is stirred at reflux temperature for 30 hours. After cooling, the reaction mixture is extracted once with diethyl ether. The aqueous layer containing the disodium salt of 3-sulfomethylcyclobutanecarboxylic acid is filtered and made strongly acid with gaseous hydrogen chloride. The sodium chloride which forms is filtered off and the filtrate is evaporated to about one-third of its original volume. An equal volume of dioxane is added to the filtrate which is then saturated with gaseous hydrogen chloride, and the sodium chloride which forms is filtered off. The filtrate is concentrated to about one-half of its volume and then diluted with an equal volume of methyl alcohol. The solution is saturated with gaseous hydrogen chloride and a small amount of sodium chloride which forms is filtered off. The filtrate is evaporated under reduced pressure and finally heated on a steam bath at 5 mm. pressure. The residue amounting to 38 parts, is a brown, viscous, water-soluble oil. This is crude 3-sulfomethylcyclobutanecarboxylic acid.

*Analysis.*—Calc'd for $C_6H_{10}SO_5$: S, 16.5%; N.E., 97. Found: S, 20.5%; N.E., 104.

This crude acid is suitable for use without purification in various applications, as illustrated below.

A 1% aqueous solution of crystal violet is heated on a steam bath, and a small strip of fabric made of polyethylene terephthalate fibers is placed in it for 15 minutes. The fabric is removed from the dye bath, washed with cold water until the washings are colorless and then air-dried. The fabric is dyed a light blue. A strip of polyethylene terephthalate fabric is dyed 15 minutes in an aqueous solution containing 1% crystal violet and 5% 3-sulfomethylcyclobutanecarboxylic acid heated on a steam bath. The dyed fabric is washed with cold water until the washings are colorless and then air-dried. In this case the fabric is dyed a dark blue. This shows the effectiveness of 3-sulfomethylcyclobutanecarboxylic acid as a dyeing assistant. In similar tests, 3-sulfomethylcyclobutanecarboxylic acid is shown to be a dyeing assistant for basis dyes such as Rowe's "Colour Index" No. 512, N,N-tetraethyl-3,7-diaminophenoxazine, and those of the type of Astrazone pink FG (Lub's "Chemistry of Snythetic Dyes and Pigments," A.C.S. Monograph 127, p. 250).

EXAMPLE IV

*Dimethyl 3-sulfo-3-methylcyclobutane-1,2-dicarboxylate (sodium salt)*

A mixture of 18.4 parts of dimethyl 3-methyl-2-cyclobutene-1,2-dicarboxylate, 15.6 parts of sodium bisulfite, 270 parts of deoxygenated water, and 1.84 parts of t-butyl peroxide is stirred overnight at room temperature. The reaction mixture is exposed to ultraviolet light for 8 hours and then stirred overnight. All of the ester is now reacted, as evidenced by its complete solution in the reaction mixture. The reaction mixture is concentrated to about one-third of its original volume by heating on a steam bath, and is then diluted with an equal volume of methanol to precipitate 4.9 parts of unreacted sodium bisulfite. The filtrate is evaporated on a steam bath under a vacuum of about 25 mm. pressure. There is obtained 24 parts of colorless, amorphous solid readily soluble in water which is the sodium salt of dimethyl 3-sulfo-3-methylcyclobutane-1,2-dicarboxylate.

EXAMPLE V

*3-sulfomethylcyclobutane - 1,2-dicarboxylic acid, sodium salt, and triethyl ester*

A mixture of 27.6 parts (0.2 mole) of 3-methylene-1,2-cyclobutanedicarboxylic anhydride, 31.2 parts (0.3 mole) of sodium bisulfite and 50 parts of water is heated on a steam bath with stirring for 4 hours. The mixture is cooled in ice and saturated with dry hydrogen chloride, and then is diluted with ethyl alcohol to precipitate the sodium chloride which forms. The precipitated sodium chloride is filtered out and the filtrate is evaporated in vacuum at room temperature. The dilution with ethyl alcohol and saturation with hydrogen chloride are repeated. Sodium chloride which forms is again filtered out. The filtrate is concentrated under a vacuum of about 25 mm. pressure at room temperature. There is obtained a heavy oil that has a neutral equivalent of 205. (The theoretical neutral equivalent for 3-sulfomethylcyclobutane-1,2-dicarboxylic acid is 79.0.) This oil is evaporated under a vacuum of 10–20 mm. on a steam bath to constant weight, about 2 days being required. A titration curve obtained on this product shows two inflections, one occurring at a pH of 4.35 and the second at 9.15. This titration indicates a neutral equivalent of 329 which shows in turn that the material is largely neutral. The saponification equivalent is found to be 89.2 (the theoretical saponification equivalent of the triethyl ester of 3-sulfomethylcyclobutane - 1,2-dicarboxylic acid is 107). The combination of saponification equivalent and neutral equivalent values obtained on the product indicates that it comprises 24% of 3-sulfomethylcyclobutane - 1,2-dicarboxylic acid and 75% of the triethyl ester of this acid. The total amount of product amounts to 44.6 parts, which corresponds to 69.4% of the theoretical yield.

EXAMPLE VI

*3-sulfomethylcyclobutane - 1,2 - dicarboxylic acid and sodium salt*

Example V is repeated with the same quantities of reactants and the same reaction conditions. The resultant aqueous solution of the sodium salt of 3-sulfomethylcyclobutane-1,2-dicarboxylic acid is passed through a 1-inch by 20-inch column packed with the ion exchange resin sold under the trademark "Amberlite" IR-120. The column is then eluted with water and the eluate is concentrated to a small volume. When the volume of solution reaches approximately 100 parts, a small amount of solid separates. This solid is 3-sulfomethylcyclobutane-1,2-dicarboxylic acid, having a melting point of 162-175° C. and it amounts to 5.9 parts, corresponding to a yield of 12.6%.

*Analysis.*—Calc'd for $C_7H_9O_7S$: N.E., 79.0. Found: N.E., 79.5.

The filtrate obtained after the removal of the above acid is evaporated to constant weight in a vacuum oven at 60° C. and 10-20 mm. pressure. These is thus obtained 40.1 parts (corresponding to an 84% yield) of crude 3-sulfomethylcyclobutane-1,2 - dicarboxylic acid as a black oil that has a neutral equivalent of 92.5.

The examples above have illustrated the preparation of products included in this invention by reference to certain sulfonated cyclobutanecarboxylic acids, and derivatives hydrolyzable thereto. It is readily apparent that other cyclobutanes having (a) a sulfo or sulfoalkyl group, or a salt of these groups, and (b) at least one carboxyl group or group hydrolyzable thereto are within the scope of the invention. Thus, when the specific methylenecyclobutanecarboxylic acids and derivatives hydrolyzable thereto listed in Table I below are substituted for the specific methylenecyclobutanecarboxylic acids and derivatives thereof of Examples I, II, V and VI and reacted with aqueous bisulfites, and the reaction products worked up as in those examples, the specific sulfonated cyclobutanecarboxylic acids, and derivatives hydrolyzable thereto, listed in the second column of Table I, are obtained.

TABLE I

| Methylenecyclobutanecarboxylic Acid Reactant | Sulfonated Cyclobutanecarboxylic Acid Products |
| --- | --- |
| 1-Methyl-3-methylenecyclobutane-carboxylic acid. | 1-Methyl-3-sulfomethylcyclobutanecarboxylic acid, and ammonium salt. |
| 1-Methyl-3-methylenecyclobutane-carboxamide. | 1-Methyl-3-sulfomethylcyclobutanecarboxamide, and sodium salt. |
| Methyl 3-methylenecyclobutane-carboxylate. | Methyl 3-sulfomethylcyclobutane carboxylate, and sodium salt. |
| 3-Methylenecyclobutanecarboxylic acid. | 3-Sulfomethylcyclobutanecarboxylic acid, and potassium salt. |
| Diethyl 3-methylenecyclobutane-1,2-dicarboxylate. | Diethyl 3-sulfomethylcyclobutane-1,2-dicarboxylate (sodium salt). |
| 1-Methyl-3-methylenecyclobutane-carbonitrile. | 1-Methyl-3-sulfomethylcyclobutanecarbonitrile. |

Likewise, when the specific cyclobutenecarboxylic acid of Example IV is replaced by the particular cyclobutenecarboxylic acids, and derivatives hydrolyzable thereto, listed in the following Table II, and reacted with a bisulfite, the specific sulfonated cyclobutanecarboxylic acids, and derivatives hydrolyzable thereto, listed in the second column of Table II are obtained.

TABLE II

| Alkylcyclobutenecarboxylic Acid Reactant | Sulfonated Cyclobutanecarboxylic Acid Products |
| --- | --- |
| 3-Methyl-2-cyclobutene-1,2-dicarboxylic acid. | 3-Sulfo-3-methylcyclobutane-1,2-dicarboxylic acid, and sodium salt. |
| 3-Methyl-2-cyclobutene-1,2-dicarboxamide. | 3-sulfo-3-methylcyclobutane-1,2-dicarboxamide, and ammonium salt. |
| 3-Methyl-2-cyclobutene-1,2-dicarboxanilide. | 3-Sulfo-3-methylcyclobutane-1,2-dicarboxanilide, and potassium salt. |
| Disodium 3-methyl-2-cyclobutene-1,2-dicarboxylate. | Trisodium 3-sulfo-3-methyl cyclobutane-1,2-dicarboxylate. |
| 3-n-Hexyl-2-cyclobutene-1,2-dicarboxylic acid. | 3-Sulfo-3-n-hexylcyclobutane-1,2-dicarboxylic acid, and sodium salt. |
| Diethyl 3-isobutyl-2-cyclobutene-1,2-dicarboxylate. | Diethyl 3-sulfo-3-isobutylcyclobutane-1,2-dicarboxylate, sodium salt. |

The methylenecyclobutanecarboxylic acids, and derivatives hydrolyzable thereto, used as starting materials in making the products of this invention can be prepared by heating at 150–250° C., in the absence of a polymerization initiator, a mixture of an allene having at least one of the terminal carbon atoms of the allene group unsubstituted, and a substituted ethylene having a carboxyl group or group hydrolyzable thereto. This process is described in greater detail in U.S. application Serial No. 532,376, filed September 2, 1955, by H. N. Cripps, now U.S. Patent 2,914,541.

The 3-alkyl-2-cyclobutene-1,2-dicarboxylic acids are prepared by treating 3-alkylidene-1,2-cyclobutanedicarboxylic anhydrides having at least one hydrogen atom on the carbon of the alkylidene group attached to the cyclobutane ring with an aqueous alkali having a pH of more than 7.5 at ordinary or elevated temperatures, preferably at 70–120° C., followed by acidification of the reaction mixture. This process is described in greater detail in U.S. Patent No. 2,848,478 issued to B. C. Pratt. The functional derivatives hydrolyzable to the acids can be prepared from the 3-alkyl-2-cyclobutene-1,2-dicarboxylic acids by conventional methods.

As illustrated hereinbefore, the products of this invention include, in addition to the free acids, those derivatives which are hydrolyzable to the acids. These sulfonated cyclobutanecarboxylic acid derivatives can be prepared directly as described previously or they can be prepared from the free acids or other derivatives. Thus, the salts of the acids of this invention include salts of the sulfonated cyclobutanecarboxylic acids with ammonia, amines, e.g., methylamine, dimethylamine and triethanolamine, sodium, potassium and other metals, e.g., barium, calcium, cobalt, lead, copper and iron. The salts of ammonia, amines, sodium and potassium can be prepared directly by reaction of the appropriate salts of methylenecyclobutane- or cyclobutene-carboxylic acids and a bisulfite, while the other salts, particularly those of polyvalent metals, can be prepared by simple metathesis between an aqueous solution of an alkali metal salt of the sulfonated cyclobutanecarboxylic acid and an aqueous solution of a salt of the appropriate polyvalent metal.

Likewise, the esters and amides of the sulfonated cyclobutanecarboxylic acids can be made directly as described previously or they can be made from the free acids by esterification or amidation reactions. Thus, esters of the sulfonated cyclobutanecarboxylic acids with alcohols and phenols, e.g., methanol, ethanol, butanol, phenol, etc. and amides of these acids with ammonia, methylamine, diethylamine, etc. can be prepared by converting the acid to the acid chloride by reaction with thionyl chloride and then reacting the acid chloride with the appropriate alcohol, phenol or amine.

The products of this invention are especially useful as dye assistants in the dyeing of polyester fibers and fabrics with basic dyes. They are also useful as tanning agents for leather, and the salts are surface-active agents. High boiling esters and amides of the sulfonated cyclobutane-carboxylic acids of this invention are also useful as plasticizers for polymeric materials, e.g., cellulose esters and ethers.

I claim:

1. Cyclobutanes having the following structural formula

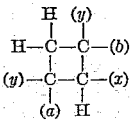

wherein (a) is selected from the class consisting of sulfo, and sulfo-lower alkyl groups and salts thereof; (b) is carboxyl; (x) is selected from the class consisting of H and (b); (x) and (b) together may equal a

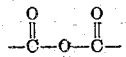

radical and (y) is selected from the class consisting of H and lower alkyl.

2. Cyclobutanes having the following structural formula

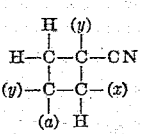

wherein (a) is selected from the class consisting of sulfo and sulfo-lower alkyl groups, and salts thereof, (x) is selected from the class consisting of H and —CN and (y) is selected from the class consisting of H and lower alkyl.

3. Cyclobutanes having the following structural formula

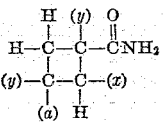

wherein (a) is selected from the class consisting of sulfo and sulfo-lower alkyl groups, and salts thereof, (x) is selected from the class consisting of

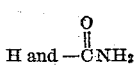

and (y) is selected from the class consisting of H and lower alkyl.

4. Cyclobutanes having the following structural formula

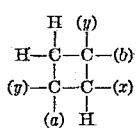

wherein (a) is selected from the class consisting of sulfo and sulfo-lower alkyl groups, and salts thereof, (b) is N-hydrocarbylcarbamyl, (x) is selected from the class consisting of H and (b) and (y) is selected from the class consisting of H and lower alkyl.

5. Cyclobutanes having the following structural formula

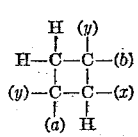

wherein (a) is selected from the class consisting of sulfo and sulfo-lower alkyl groups, and salts thereof, (b) is hydrocarbyloxycarbonyl, (x) is selected from the class consisting of H and (b) and (y) is selected from the class consisting of H and lower alkyl.

6. Cyclobutanes having the following structural formula

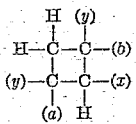

wherein (a) is selected from the class consisting of sulfo and sulfo-lower alkyl groups, and salts thereof, (b) is metal carboxylate, (x) is selected from the class consisting of H and (b) and (y) is selected from the class consisting of H and lower alkyl.

7. Cyclobutanes having the following structural formula

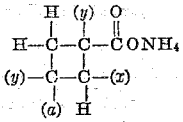

wherein (a) is selected from the class consisting of sulfo and sulfo-lower alkyl groups, and salts thereof, (x) is selected from the class consisting of

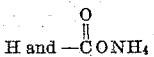

and (y) is selected from the class consisting of H and lower alkyl.

8. Cyclobutanes having the following structural formula

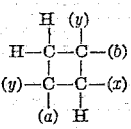

wherein (a) is selected from the class consisting of sulfo and sulfo-lower alkyl groups, and salts thereof, (b) is selected from the class consisting of methylammonium carboxylate, dimethylammonium carboxylate and triethanolammonium carboxylate, (x) is selected from the class consisting of H and (b) and (y) is selected from the class consisting of H and lower alkyl.

9. A method of making sulfonated cyclic compounds which comprises contacting, in a polar solvent at a temperature of at least 0° C., a water-soluble bisulfite with a member of the group consisting of 3-methylenecyclobutanecarboxylic acids and 3-lower alkyl-2-cyclobutene-1,2-dicarboxylic acids.

10. The process of claim 9 wherein the water-soluble bisulfite is sodium bisulfite.

11. The process of claim 9 wherein the water-soluble bisulfite is ammonium bisulfite.

12. A method of preparing sulfonated cyclobutanes which comprises contacting 3-methylenecyclobutanecarbonitrile with a water-soluble bisulfite in a polar solvent at a temperature of at least 0° C.

13. A method of preparing sulfonated cyclobutanes which comprises contacting dimethyl 3-methyl-2-cyclobutene-1,2-dicarboxylate with a water-soluble bisulfite in a polar solvent at a temperature of at least 0° C.

14. Ammonium salt of 3-sulfomethylcyclobutanecarbonitrile.

15. Sodium salt of 3-sulfomethylcyclobutanecarbonitrile.

16. 3-sulfomethylcyclobutanecarboxylic acid.

17. Disodium salt of 3-sulfomethylcyclobutanecarboxylic acid.

18. Dimethyl 3-sulfomethylcyclobutane-1,2-dicarboxylate.

No references cited.